(12) United States Patent
Yeh et al.

(10) Patent No.: US 8,549,561 B2
(45) Date of Patent: Oct. 1, 2013

(54) TV USER INTERFACE WITH RECOMMENDED CONTENT ENTRY IN FAVORITES MENU

(75) Inventors: Sabrina Tai-Chen Yeh, Laguna Beach, CA (US); Sriram Sampathkumaran, San Diego, CA (US)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 12/691,308

(22) Filed: Jan. 21, 2010

(65) Prior Publication Data

US 2011/0047568 A1 Feb. 24, 2011

Related U.S. Application Data

(60) Provisional application No. 61/274,702, filed on Aug. 19, 2009.

(51) Int. Cl.
*G06F 3/00* (2006.01)
*G06F 13/00* (2006.01)
*H04N 5/445* (2011.01)

(52) U.S. Cl.
USPC .................................. 725/46; 725/43; 725/44

(58) Field of Classification Search
USPC .......................... 725/40, 43, 44, 46
See application file for complete search history.

(56) References Cited

U.S. PATENT DOCUMENTS

| | | | |
|---|---|---|---|
| D398,299 S * | 9/1998 | Ballay et al. | D14/488 |
| 6,281,940 B1 * | 8/2001 | Sciammarella | 348/564 |
| 6,727,914 B1 | 4/2004 | Gutta | |
| 7,434,244 B2 | 10/2008 | Popov et al. | |
| 7,895,624 B1 * | 2/2011 | Thomas et al. | 725/44 |
| 2001/0016947 A1 * | 8/2001 | Nishikawa et al. | 725/51 |
| 2003/0046695 A1 * | 3/2003 | Billmaier et al. | 725/39 |
| 2006/0136246 A1 * | 6/2006 | Tu | 705/1 |
| 2008/0134043 A1 | 6/2008 | Georgis et al. | |
| 2008/0271078 A1 * | 10/2008 | Gossweiler et al. | 725/40 |
| 2009/0070816 A1 | 3/2009 | Szostek et al. | |
| 2009/0077589 A1 | 3/2009 | Boyer et al. | |
| 2009/0222857 A1 | 9/2009 | Nagano | |
| 2010/0251305 A1 * | 9/2010 | Kimble et al. | 725/46 |

OTHER PUBLICATIONS

"Automatice TV Program Selection and Receding in Personal Video Recorder by Recommendation Technology". http://www.toshiba.co.jp/rdc/rd/fields/06_e03_e.htm.

* cited by examiner

*Primary Examiner* — Hunter B Lonsberry
(74) *Attorney, Agent, or Firm* — John L. Rogitz; John M. Rogitz

(57) ABSTRACT

A "recommendation" genus entry is added to the list of other genre in a TV "favorites" menu. Entries in the recommendation genus entry are depicted in a stack and sorted by recommendation strength and channel number. A user can elect to hide the recommendation entry from the favorites menu.

20 Claims, 3 Drawing Sheets

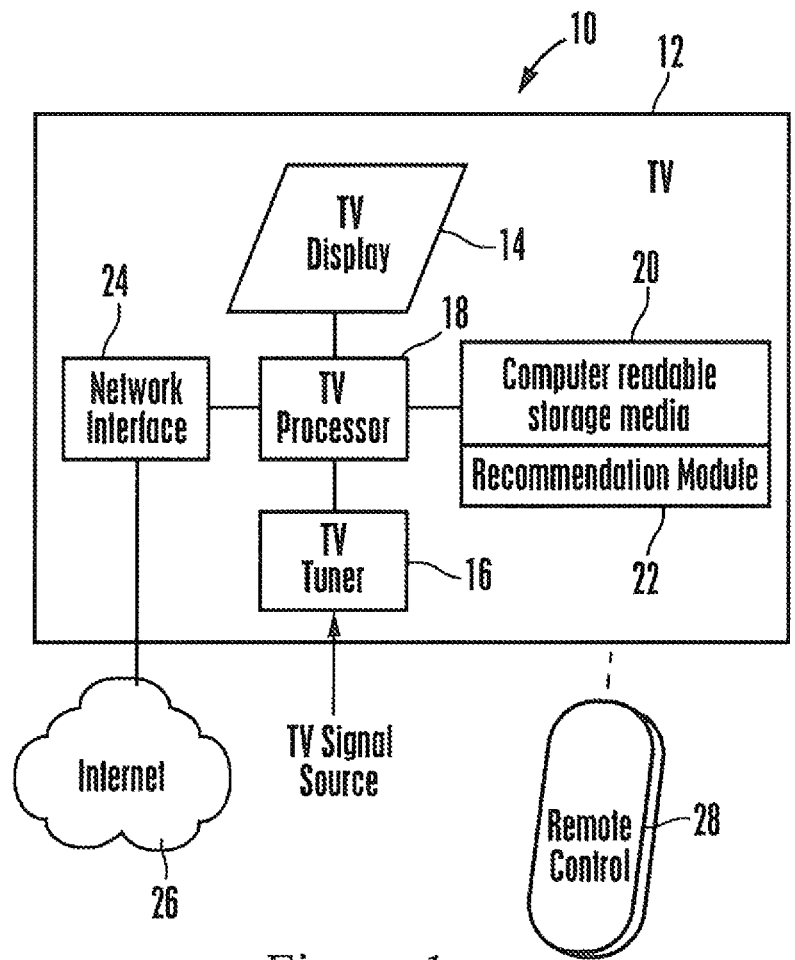
Figure 1
Figure 2
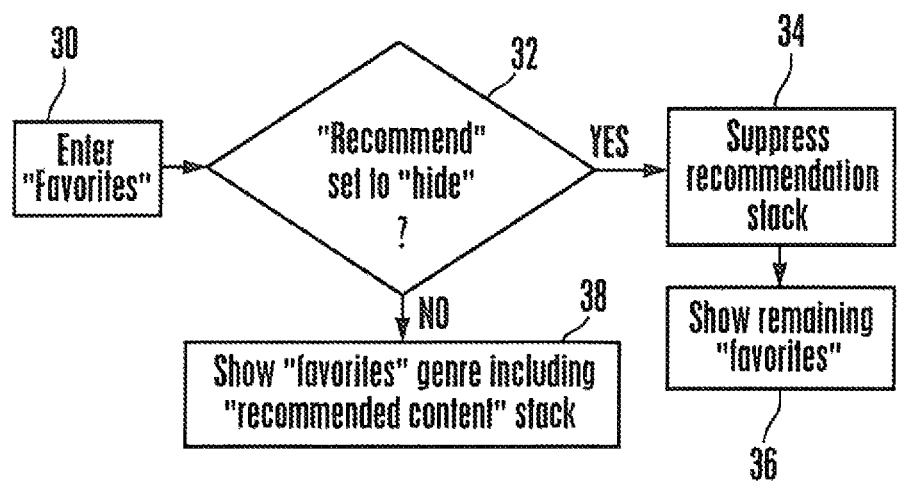

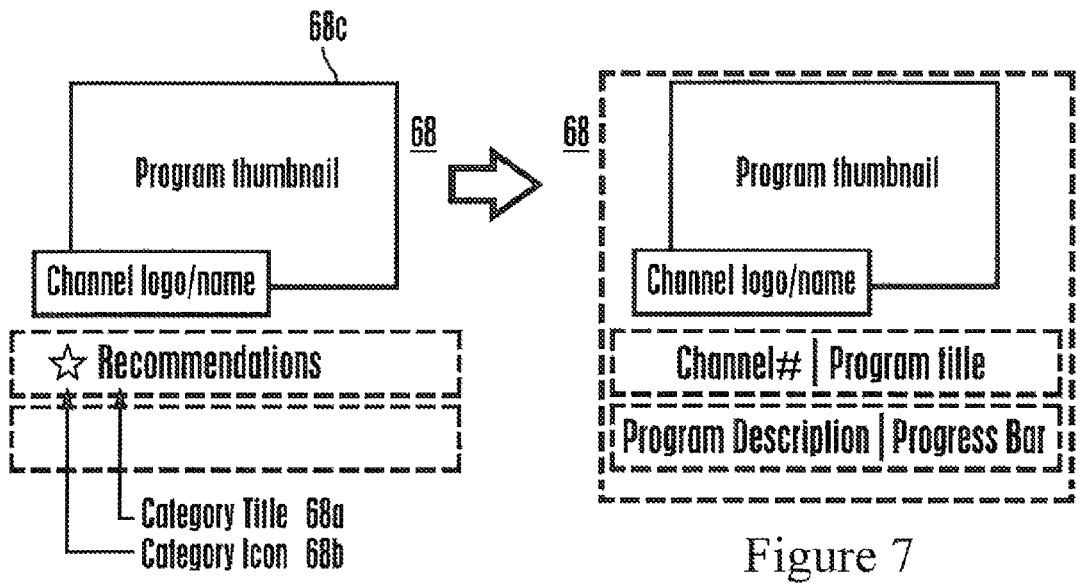
Figure 6
Figure 7
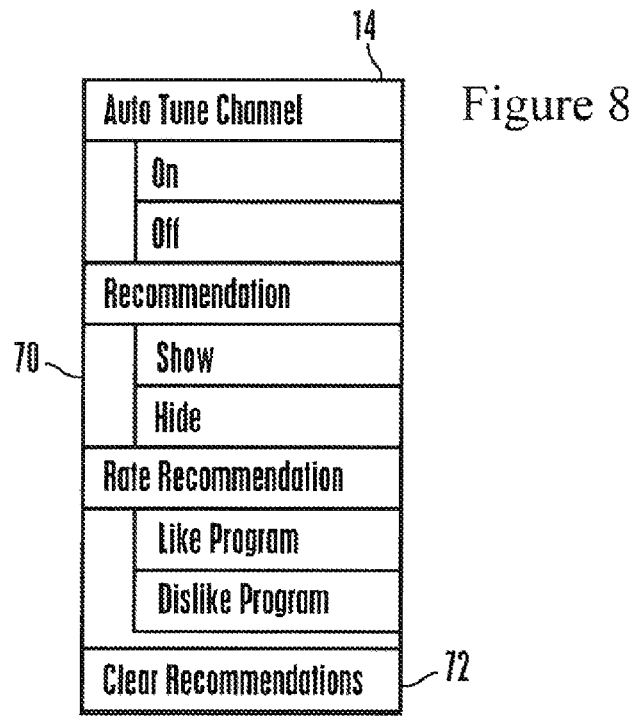
Figure 8

TV USER INTERFACE WITH RECOMMENDED CONTENT ENTRY IN FAVORITES MENU

This application claims priority from U.S. provisional application 61/274,702, filed Aug. 19, 2009.

I. FIELD OF THE INVENTION

The present application is directed to presenting a recommended content genus in a favorites category along with other favorite genre.

II. BACKGROUND OF THE INVENTION

Computer-executed content recommendation engines have been provided that provide a user with recommended content based on user behavior. As understood herein, in the TV context a recommendation engine may correlate viewed channels, program times, and program types, both past and current, to other content that matches the user behavior within the constraints of the engine. The recommendation engine then outputs a list of recommended content. Present principles understand that in the TV context, the recommended content list advantageously should be integrated with the overall look and feel of the TV's user interface (UI) for ease of use and understanding.

SUMMARY OF THE INVENTION

As viewers watch TV, an internal recommendation engine residing in the TV software builds a viewing history based on, e.g., the frequency with which particular programs, content genre, and times are viewed. The results of the recommendation engine are displayed in a consolidated area within the television "Favorites" menu. The user can navigate all the recommended items by simple press of a cursor up/down key, which displays the recommended program along with program metadata (program information such as title, description). The recommendations are not necessarily limited to television content, but can also extend to recommended content provided by interne content providers, recommended software "widgets", etc.

Accordingly, a TV includes a display, a processor communicating with a TV tuner and controlling presentation on the display, and a computer readable storage medium accessible to the processor and storing a content recommendation module executable to output recommended content based at least in part on user viewing behavior. The processor presents a favorite genre user interface (UI) which includes a favorite TV channel genus entry and a tuned-to channel history genus entry. A recommended content genus entry is also provided on the favorite genre UI and is straddled by the favorite TV channel genus entry and the tuned-to channel history genus entry.

Additionally, the processor is responsive to user input to selectively remove the recommended content genus entry from the favorite genre UI. Further, the processor is responsive to a screen cursor to establish a non-focused presentation of the recommended content genus entry, wherein a recommended content genus title and a thumbnail of at least one recommended content is presented, and a focused presentation of the recommended content genus entry, wherein the recommended content genus title is not presented and a thumbnail of at least one recommended content is presented along with a program title, channel number, and program description associated with the thumbnail. If desired, the processor causes "N" recommended contents associated with the recommended content genus entry to be sorted at least in part by recommendation strength. The recommended contents are tested to ensure that no recommended content is on a user-defined blocked channel and to ensure that each recommended content conforms to a user-defined parental rating.

In example embodiments recommended contents with the same recommendation strength are sorted by channel number. The favorite genre UI may further include a photo genus entry, a music genus entry, a video genus entry, an Internet TV genus entry, an inputs genus entry, and a widgets genus entry. In specific example embodiments the favorite genre UI includes, from left to right on the display, a photo genus entry, a music genus entry, a video genus entry, an Internet TV genus entry, the tuned-to channel history genus entry, the recommended content genus entry, the favorite TV channel genus entry, an inputs genus entry, and a widgets genus entry.

As set forth in greater detail below, wherein the recommended contents can be presented as a stack on the display. The stack can be periodically refreshed along with refreshing other genus entries. A recommendations icon may presented on the display in the non-focused presentation but not presented on the display in the focused presentation. The processor may be responsive to user input to clear the recommended contents from the recommended content genus entry.

In another aspect, a method includes enabling a user to select a TV menu. In an example, the menu may be a favorites menu, although other menus may be used. The method presents the TV menu and includes on the TV menu a recommended content entry stack along with other entries on the menu.

In another aspect, an assembly includes a TV tuner, a display receiving signals output by the TV tuner, and a processor communicating with the TV tuner and the display. A computer readable medium bears instructions executable by the processor to present a favorite genre user interface (UI) including at least a favorite TV channel entry and a recommended content entry selectable to view information associated with content recommended based at least in part on viewer behavior.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a flow chart of example logic that can be executed when "favorites" is selected from a top level menu;

FIG. 6 is a screen shot of an example detail of the "recommendation" genus entry on the "favorites" menu when the "recommendation" entry is not in "focus";

FIG. 7 is a screen shot of an example detail of the "recommendation" genus entry on the "favorites" menu when the "recommendation" entry is in "focus"; and FIG. 8 is a screen shot of an example "recommendation" setup menu.

DETAILED DESCRIPTION OF THE PREFERRED EMBODIMENT

Figure 3:
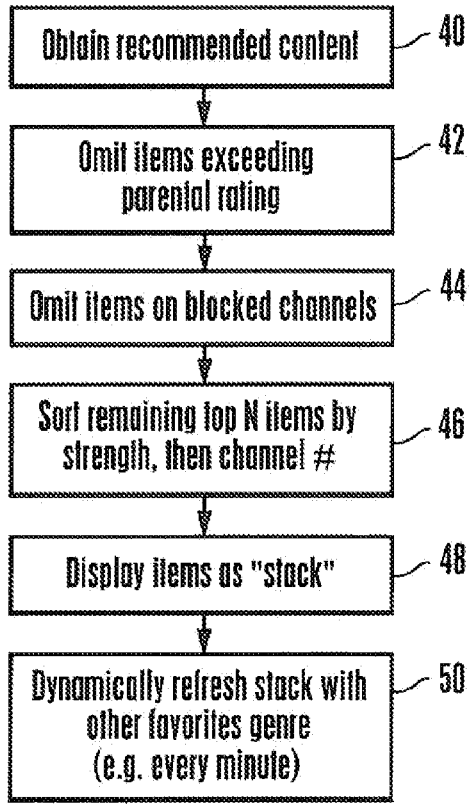
FIG. 3 is a flow chart of example logic that can execute to display recommended content.

Referring initially to FIG. 1, an assembly 10 is shown which includes a TV chassis 12 bearing a TV display 14 such as a standard definition and/or high definition matrix display. The display 14 presents video from a TV tuner 16 which may be in the chassis 12 as shown or which may be implemented in a separate set-top box. The TV tuner 16 receives TV signals from one or more TV sources including satellite receivers, cable head ends, and terrestrial broadcast transmitters.

A TV processor 18 communicates with the TV tuner 16 and with the display to control presentation on the display. The TV processor 18 accesses one or more computer readable storage media 20 such as but not limited to disk-based and/or solid state storage to execute instructions thereon. Among other instruction modules, the media 20 may bear a content recommendation module or engine 22 that outputs recommended content based on viewer behavior such as which channels are tuned to and at what time of day, which programs are viewed, frequency of viewing, etc. Without limitation, the engine 22 may be established any one of the engines in U.S. Pat. No. 7,559,072, U.S. Pat. No. 7,487,151, incorporated herein by reference.

The TV processor may also communicate with a network interface 24 within the chassis 12. The network interface 24 may be, without limitation, a wired or wireless modem or other appropriate interface to communicate with a wide area network such as the Internet 26, from which additional content such as Internet Protocol TV (IPTV) content, "widgets", etc. may be downloaded. A user can input user control signals to the processor for selection and cursor navigation using a remote control (RC) 28.

Now referring to FIG. 2, at block 30 a user signal is received commanding the processor 18 to display a "favorites" menu. At decision diamond 32 it is determined whether a user previously has input a command to hide or suppress the below-described recommended content genus entry from the favorites menu, and if so the logic moves to block 34 to suppress the recommended content genus entry and then display remaining favorite genre at block 36. In contrast, if the user has not elected to suppress the recommended content genus entry (or equivalently has affirmatively input a signal that it should be display), the favorites menu described further below is presented at block 38 with the recommended content genus entry.

FIG. 3 shows example logic for ordering the individual instances of recommended content in the below-described stack of recommended content. A list of recommended content is obtained at block 40 by executing the recommendation engine 22 on the computer readable media 24, which uses heuristics and rules typically based on viewer viewing patterns, e.g., channel tuned to, at what time, for how long, what program/program genre was viewed, etc. It is to be understood that the details of the recommendation engine are not limiting on present principles.

At block 42, items on the list that exceed user-input parental ratings are removed from the list. Similarly, at block 44 any items of recommended content on the list that are indicated as appearing on a user-defined blocked channel are pruned from the list. The remaining top "N" (e.g., twenty) items on the list by recommendation strength are sorted, first by strength and then, as between two or more items of equal strength, by channel number. Thus, for example, if three items all have the same strength, the items are sorted in the list in either ascending channel order or descending channel, order. The sorted items are then presented on the display 14 as more fully described below in a virtual "stack" at block 48. If desired, the stack may be dynamically refreshed at block 50 along with other genre in the favorites menu, e.g., every minute or so, although the user may not be permitted to reorder the list.

Figure 4:
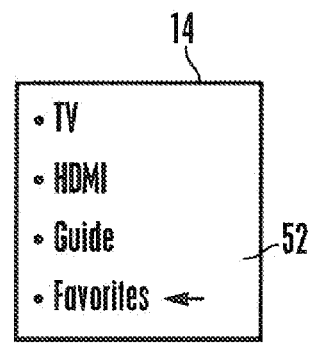
FIG. 4 is a screen shot of an example top level menu from which "favorites" may be selected.

FIG. 4 shows an example top level menu 52 that may be invoked when, e.g., a user manipulates a "menu" key on the RC 28. The menu 52 may include a "TV" entry to cause the TV to present input from the TV tuner, a "HDMI" entry to cause the TV to present content from a high definition multimedia interface (HDMI) source such as a video disk player, and a "guide" entry to cause the TV to present an electronic program guide. The menu 52 may also include a "favorites" entry that can be selected as indicated by the arrow to cause the TV to present a "favorites" menu such as the one shown in FIG. 5.

Figure 5:
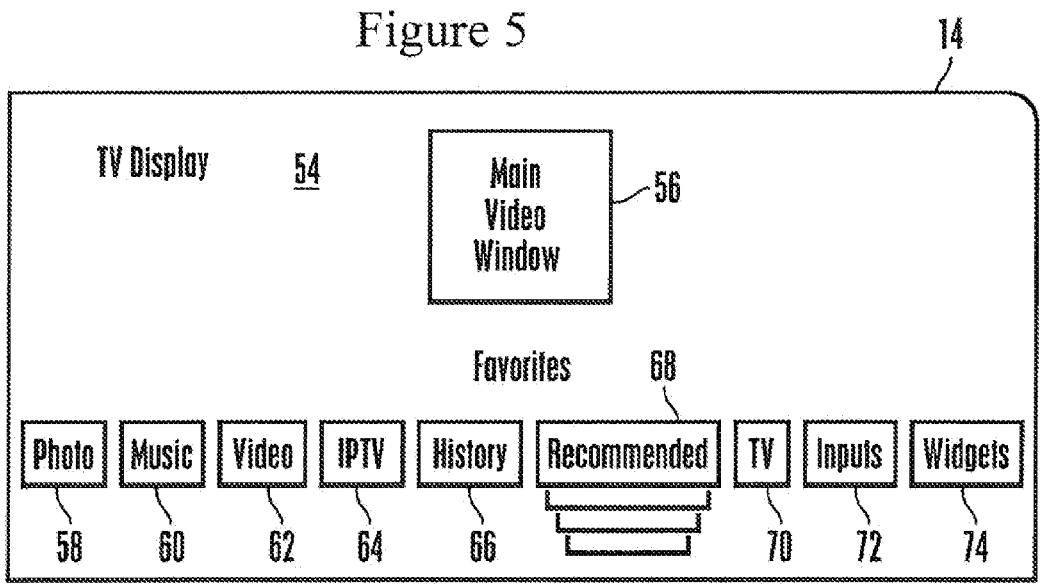
FIG. 5 is a screen shot of an example "favorites" menu.

Turning to FIG. 5, a favorites menu screen 54 may include a main video window 56 in which, for instance, video from a currently tuned-to channel is shown. The favorites menu may also include multiple favorites genus entries. In the embodiment shown, the favorites menu includes, from left to right on the display 14, a photo genus entry 58, a music genus entry 60, a video genus entry 62, an Internet TV genus entry 64, a tuned-to channel history genus entry 66, the recommended content genus entry 68 discussed further below, a favorite TV channel genus entry 70, an inputs genus entry 72, and a widgets genus entry 74. In the embodiment of FIG. 5, the recommended content genus entry 68 is straddled by the history genus entry 66 and the TV genus entry 70.

As shown, the recommended content genus entry 68 may depict a "stack" of recommended content squares overlaid on each other.

Each genus entry may be selected by means of, e.g., the RC 28 to cause a list of display of favorite items from the selected genus. Thus, for example, selection of the TV genus entry 70 causes user-defined "favorite" channels to be listed. Likewise, favorite photos stored on, e.g., the media 20 can be displayed by selecting the photo entry 58, while favorite music content may be listed by selecting the music entry 60. Favorite videos stored on, e.g., the media 20 may be listed by selecting the video entry 62, and favorite IPTV contents may be listed by selecting the IPTV entry 64. A history of the most recent viewings may be selected by clicking on the history entry 66, while the list of "N" recommended contents can be presented by selecting the entry 68 in the order sorted as described above. Favorite inputs may be selected for display by selecting the input entry 72, while favorite widgets may be listed in response to selection of the widget entry 74.

FIG. 6 shows the details of the recommended content genus entry 68 when the screen cursor is not hovered over it to focus it (i.e., when the entry 68 is in a non-focused presentation) while FIG. 7 shows the entry 68 in a focus presentation (when the cursor is hovered over the entry, for instance). In the non-focused presentation, a recommended content genus title 68a and a thumbnail 68c of at least one recommended content is presented. A recommended content icon 68b may also be presented. In the focused presentation of the recommended content genus entry in FIG. 7, on the other hand, the recommended content genus title is not presented and the thumbnail of a recommended content is presented along with a program title, channel number, and program description associated with the thumbnail. A progress bar may also be presented as shown.

FIG. 8 shows an example UI 70 for allowing a user to select whether to show the recommended content genus entry 68 in the favorites menu 54 of FIG. 5 or to hide the recommended content genus entry 68 from the favorites menu. If desired, the UI 70, which may be part of a setup menu, may also enable a user to select whether to turn automatic channel tuning on or off, and to rate individual items of recommended content as being "liked" or "disliked". In some embodiments a "clear recommendations" selection 72 may be provided to allow a user to clear the list of recommended content, with the engine/ module 22 being used to construct a new list based on subsequent viewer behavior.

While the particular TV USER INTERFACE WITH RECOMMENDED CONTENT ENTRY IN FAVORITES MENU is herein shown and described in detail, it is to be understood that the subject matter which is encompassed by the present invention is limited only by the claims. For example, recommendations which extend into the future can be provided when, for instance, the television is equipped with recording capability (such as a DVR), or reminders for future broadcast content.

What is claimed is:

1. TV comprising:
   display;
   processor configured for controlling presentation on the display;
   computer readable storage medium accessible to the processor and storing a content recommendation module executable by the processor to output recommended content based at least in part on user viewing behavior;
   the processor configured to execute the module to present a favorite genre user interface (UI) including a recommended content genus entry, the processor being responsive to a screen cursor to establish a non-focused presentation of the recommended content genus entry, wherein a recommended content genus title and a thumbnail of at least one recommended content is presented, and a focused presentation of the recommended content genus entry, wherein the recommended content genus title is not presented and a thumbnail of at least one recommended content is presented along with a program title, channel number, and program description associated with the thumbnail, the processor when executing the module being configured for causing "N" recommended contents associated with the recommended content genus entry to be sorted at least in part by recommendation strength;
   wherein a recommendations icon is presented on the display in the non-focused presentation, the recommendations icon not being presented on the display in the focused presentation.

2. The TV of claim 1, wherein recommended contents with the same recommendation strength are sorted by channel number, wherein at least one content is recommended at least based on the duration a user has viewed at least one TV channel.

3. The TV of claim 1, wherein the favorite genre UI further includes a photo genus entry, a music genus entry, a video genus entry, an Internet TV genus entry, an inputs genus entry, and a widgets genus entry.

4. The TV of claim 1, wherein the favorite genre UI includes, from left to right on the display, a photo genus entry, a music genus entry, a video genus entry, an Internet TV genus entry, a tuned-to channel history genus entry, the recommended content genus entry, a favorite TV channel genus entry, an inputs genus entry of the favorite inputs of a user of the favorite genre UI, and a widgets genus entry.

5. The TV of claim 1, wherein the recommended contents are presented as a stack on the display, the stack being established by two-dimensional objects overlaid on each other in an overlapping relationship such that a first object appearing beneath a second object appears to be partially eclipsed by the second object, the stack being manipulable based on user input to at least cause the second object to appear beneath the first object to appear to be partially eclipsed by the first object.

6. The TV of claim 5, wherein the stack is periodically refreshed along with refreshing other genus entries.

7. The TV of claim 1, wherein the processor is responsive to user input to clear the recommended contents from the recommended content genus entry presented on the favorite genre UI.

8. Method comprising:
   enabling a user to select a user interface (UI) presentable on a consumer electronics (CE) device; and
   presenting the UI on at least one CE device;
   wherein the UI includes a recommended content genus entry, the UI having a first configuration including a non-focused presentation of the recommended content genus entry wherein a recommended content genus title and a thumbnail of at least one recommended content is presented, and the UI having a second configuration including a focused presentation of the recommended content genus entry wherein the recommended content genus title is not presented and a thumbnail of at least one recommended content is presented along with a program title, channel number, and program description associated with the thumbnail.

9. The method of claim 8, wherein the UI includes a favorite TV channel genus entry and a tuned-to channel history genus entry, the recommended content entry being straddled by the favorite TV channel genus entry and the tuned-to channel history genus entry.

10. The method of claim 9, comprising selectively removing the recommended content entry from the UI.

11. The method of claim 9, comprising causing "N" recommended contents associated with the recommended content entry to be sorted at least in part by recommendation strength.

12. The method of claim 9, comprising sorting by channel number recommended contents with the same recommendation strength.

13. The method of claim 9, wherein the UI includes, from left to right, a photo genus entry, a music genus entry, a video genus entry, an Internet TV genus entry, the tuned-to channel history genus entry, the recommended content entry, the favorite TV channel genus entry, an inputs genus entry, and a widgets genus entry.

14. The method of claim 8, wherein a recommendations icon is presented in the non-focused presentation, the recommendations icon not being presented in the focused presentation.

15. The method of claim 8, wherein in the focused presentation, the recommended content genus title is not presented by replacing the recommended content genus title with at least one of the program title and channel number.

16. Assembly comprising:
   display;
   processor communicating with the display; and
   computer readable medium bearing instructions executable by the processor to present a favorite genre user interface (UI) including at least a favorite TV channel entry and a recommended content entry selectable to view information associated with content recommended based at least in part on viewer behavior, wherein the processor is responsive to a screen cursor to establish a non-focused presentation of the recommended content entry, wherein a recommended content genus title and a thumbnail of at least one recommended content is presented, and a focused presentation of the recommended content entry, wherein the recommended content genus title is not presented and a thumbnail of at least one recommended content is presented along with a program title, channel number, and program description associated with the thumbnail.

17. The assembly of claim 16, wherein the favorite genre UI includes, from left to right on the display, a photo genus entry, a music genus entry, a video genus entry, an Internet TV genus entry, a tuned-to channel history genus entry, the recommended content entry, and the favorite TV channel entry.

18. The TV of claim 1, wherein the favorite genre user interface (UI) includes a favorite TV channel genus entry and a tuned-to channel history genus entry, the recommended content genus entry being straddled by the favorite TV channel genus entry and the tuned-to channel history genus entry.

19. The apparatus of claim 16, wherein the instructions are executable by the processor to cause the processor to present a like selector and a dislike selector, the selectors pertaining to at least one recommended content, the selectors configured for manipulation by a user to provide input to the processor indicating whether the user likes or dislikes the recommended content based on selection of the like selector or dislike selector, respectively, the recommended content to which the selectors pertain being received by the apparatus over a TV channel provided through a TV tuner associated with the apparatus.

20. The apparatus of claim 16, wherein in the focused presentation, the recommended content genus title is not presented by replacing the recommended content genus title with at least one of the program title and channel number.

* * * * *